United States Patent [19]

Warner et al.

[11] Patent Number: 4,728,792

[45] Date of Patent: Mar. 1, 1988

[54] SORPTION SHEET FOR SORBING A PLURALITY OF DISCRETE SAMPLES AND METHOD OF PRODUCING SUCH A SORPTION SHEET AND USE THEREOF

[76] Inventors: Gerald T. Warner, Staverton, Pullen's Field; Colin G. Potter, 13 Lime Walk, both of Headington, Oxford, Great Britain

[21] Appl. No.: 855,443

[22] Filed: Apr. 24, 1986

[30] Foreign Application Priority Data

May 20, 1985 [SE] Sweden .............................. 8502474

[51] Int. Cl.[4] ............................................. G01N 35/00
[52] U.S. Cl. .................................. 250/328; 250/432 R
[58] Field of Search ..................... 250/328, 428, 507.1, 250/506.1, 432 R, 505.1

[56] References Cited

U.S. PATENT DOCUMENTS 3,855,473 12/1974 Burgess et al. ....................... 250/328
4,298,796 11/1981 Warner et al. ..................... 250/361 R
4,587,277 5/1986 Sato ................................. 250/505.1

FOREIGN PATENT DOCUMENTS 0166900 8/1985 Japan .............................. 250/486.1

OTHER PUBLICATIONS

G. T. Warner, C. G. Potter, T. Yrjonen, and E. Soini, "A New Design for a Liquid Scintillation Counter for Micro Samples Using a Flat-Bed Geometry" Int. J. Appl. Radiat. Isot., vol. 36, No. 10, (1985), pp. 819–821.

Primary Examiner—Janice A. Howell
Assistant Examiner—Constantine Hannaher
Attorney, Agent, or Firm—Fisher, Christen & Sabol

[57] ABSTRACT

In a sorption sheet (1) for sorbing a plurality of discrete samples that simultaneously emit photons or beta particles, the emission thereof to be individually monitored, barriers (2) of a photon and/or beta particle attenuating material extend through at least a portion of the thickness of the sheet (1) which is known per se, to prevent cross-talk between the samples when monitored. The barriers are produced by soaking a liquid photon and/or beta particle attenuating material in a pattern of lines through at least a portion of the thickness of the sheet, whereupon that material is dried and/or cured.

17 Claims, 2 Drawing Figures

SORPTION SHEET FOR SORBING A PLURALITY OF DISCRETE SAMPLES AND METHOD OF PRODUCING SUCH A SORPTION SHEET AND USE THEREOF

TECHNICAL FIELD

The invention relates to a sorption sheet for sorbing a plurality of discrete samples that simultaneously emit photons or beta particles, the emission thereof to be individually monitored, and a method of producing such a sorption sheet and use thereof.

BACKGROUND ART

Such a sorption sheet is known, e.g. from U.S. Pat. No. 4,298,796. The sorption sheet or support layer according to that patent comprises a filter mat of nitro-cellulose or glass fibre for supporting a plurality of beta particle emitting samples. This sheet is to be contacted with a scintillant to convert the beta particles into photons to be detected by means of a photodetector.

In use of this known sorption sheet radioactivity from one sample may diffuse towards an adjacent sample. Moreover, when the photodetector is monitoring a certain sample, photons from adjacent samples may strike the photodetector and cause an inaccuracy of measurement. This effect is normally called "optical cross-talk".

DISCLOSURE OF INVENTION

The object of the invention is to prevent migration or diffusion of the samples into adjacent sample locations and to prevent optical cross-talk between samples when monitored.

This is attained in that barriers of a photon and/or beta particle attenuating material extend through at least a portion of the thickness of the sheet which is known per se, to prevent cross-talk between the samples when monitored.

BRIEF DESCRIPTION OF DRAWING

The invention will be described more in detail below with reference to the drawing on which

DETAILED DESCRIPTION

Figure 1:
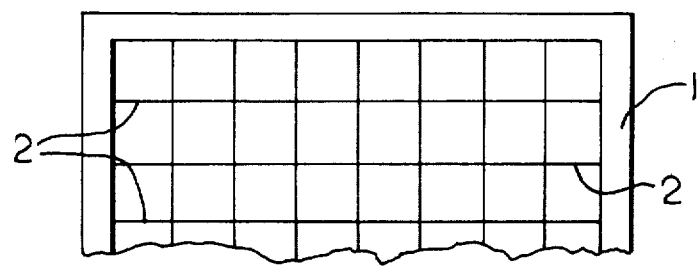
FIGS. 1 and 2 show two different embodiments of the sorption sheet according to the invention.
Figure 2:
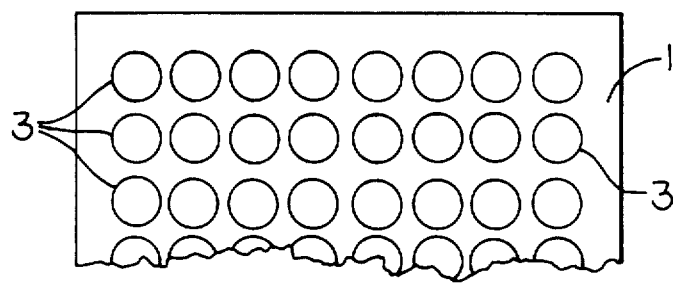

FIGS. 1 and 2 show two different embodiments of a microporous sorption sheet 1 according to the invention for sorbing a plurality of discrete samples (not shown) that simultaneously emit photons or beta particles, the emission thereof to be individually monitored. The sorption sheet as such is known per se and may be made of glass fibre, nylon, nitrocellulose or other polymers. To prevent cross-talk between samples upon monitoring on the one hand and confine each sample to a restricted area on the sheet 1 in order to prevent migration or diffusion of the samples into adjacent sample areas on the other hand, the sorption sheet 1 according to the invention is provided with barriers that extend through at least a portion of the thickness of the sheet. The barriers may extend essentially through the thickness of the sheet.

In FIG. 1 these barriers are denoted 2, while in FIG. 2 these barriers are denoted 3.

As apparent the barriers 2 in FIG. 1 form a grid pattern, while the barriers 3 in FIG. 2 are annular. In both cases the samples (not shown) will be sorbed on the sorption sheet 1 according to a matrix pattern with e.g. 8 columns as shown and 12 rows.

To produce the barriers 2 and 3 a liquid photon and/or beta particle attenuating material, e.g. black ink or resin, is soaked through at least a portion of the thickness of the sheet in the pattern of lines shown, whereupon that material is dried and/or cured to form the barriers 2 and 3, respectively, within the sheet 1. The barriers 2 and 3 according to the invention also prevent migration or diffusion of the samples (not shown).

Alternatively, the photon and/or beta particle attenuating material may be a powder which is fused on the sheet.

When the samples to be sorbed emit weak beta particles and are to be contacted with a scintillant to cause an indirect emission of photons, the barriers 2 and 3, respectively, may be discontinuous in order for the scintillant to better penetrate the sheet 1.

The sorption sheet according to the invention may equally well be used for sorbing samples that directly emit photons, e.g. samples that are luminescent.

What is claimed is:

1. In a sorption sheet for sorbing a plurality of discrete samples that simultaneously emit photons or beta particles, which in contact with a scintillant cause an indirect emission of photons wherein the photon emission from the individual samples is to be monitored, where the improvement comprises barriers of a photon and/or beta particle attenuating material extending through at least a portion of the thickness of the sheet which substantially attenuates optical cross-talk between the samples when so monitored.

2. Sheet according to claim 1, wherein said barriers extend through essentially the thickness of the sheet.

3. Sheet according to claim 2, wherein said barriers are of the photon attenuating material.

4. Sheet according to claim 1, wherein said barriers are of a fused powder.

5. Sheet according to claim 1, wherein said barriers are of the photon attenuating material.

6. Sheet according to claim 1, wherein said barriers form a grid pattern.

7. Sheet according to claim 6, wherein said barriers are of the photon attenuating material.

8. Sheet according to claim 1, wherein said barriers are annular.

9. Sheet according to claim 8, wherein said barriers are of the photon attenuating material.

10. Sheet according to claim 1, wherein said barriers are of dried ink.

11. Sheet according to claim 10, wherein said barriers are of the photon attenuating material.

12. Sheet according to claim 1, wherein said barriers are of cured resin.

13. Sheet according to claim 12, wherein said barriers are of the photon attenuating material.

14. Method of producing a sorption sheet for sorbing a plurality of discrete samples that simultaneously emit photons or beta particles, and from which the emission of photons or beta particles is to be individually monitored, characterized in that liquid photon and/or beta particle attenuating material is soaked in a pattern of lines through at least a portion of the thickness of a sorption sheet, whereupon that material is dried and/or cured to form barriers to substantially attenuate optical cross-talk between the samples when monitored.

15. The method of claim 14, wherein said plurality of discrete samples are to be in contact with a scintillant to cause an indirect emission of photons wherein photon emission from the individual samples is to be monitored.

16. The method of claim 15, wherein the formed barrier is at least one material selected from the group consisting of a dried ink, a cured resin and a fused powder.

17. A method for substantially attenuating optical cross-talk in monitoring a sample on a sorption sheet for sorbing a plurality of discrete samples that simultaneously omit photons or beta particles, which in contact with a scintillant cause an indirect emission of photons, wherein the photon emission from the individual sample is to be monitored, comprising providing barriers of a photon and/or beta particle attenuating material extending through at least a portion of the thickness of the sheet for the plurality of discrete samples; sorbing said plurality of discrete samples within said barriers on said sorbtion sheet; contacting said sorption sheet which is so sorbed with a scintillant, and monitoring the individual sample under conditions such that optical cross-talk is substantially attenuated in comparison to the corresponding sorbtion sheet without said barriers.

* * * * *

UNITED STATES PATENT AND TRADEMARK OFFICE
CERTIFICATE OF CORRECTION

PATENT NO. : 4,728,792

DATED : Mar. 1, 1988

INVENTOR(S) : Warner et al.

Figure 3:
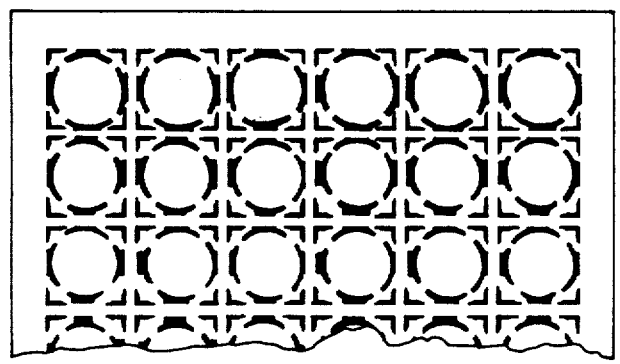

It is certified that error appears in the above-identified patent and that said Letters Patent is hereby corrected as shown below:

Delete Fig. 3.

Signed and Sealed this

Fifth Day of July, 1988

Attest:

DONALD J. QUIGG

*Attesting Officer*  *Commissioner of Patents and Trademarks*